Mar. 20, 1923.

C. F. COWDREY

AUTOMOBILE ATTACHMENT

Filed May 29, 1922    2 sheets-sheet 2

1,448,912

INVENTOR:
Charles F. Cowdrey
BY Robt. P. Hains
ATTORNEY

Patented Mar. 20, 1923.

1,448,912

UNITED STATES PATENT OFFICE.

CHARLES F. COWDREY, OF FITCHBURG, MASSACHUSETTS.

AUTOMOBILE ATTACHMENT.

Original application filed November 26, 1921, Serial No. 518,023. Divided and this application filed May 29, 1922. Serial No. 564,670.

*To all whom it may concern:*

Be it known that I, CHARLES F. COWDREY, a citizen of the United States, residing in Fitchburg, county of Worcester, and State of Massachusetts, have invented an Improvement in Automobile Attachments, of which the following description, in connection with the accompanying drawings, is a specification, like characters on the drawings representing like parts.

This invention relates to means for holding the foot-brake of an automobile in the brake applying position while the action of the brake upon each rear wheel is being tested.

It is important that brakes of an automobile or other vehicle be so adjusted that they will act with equal or substantially equal force upon the rear wheels of the same, and while this is true of both the foot brake and the emergency brake, the condition of the foot brake is in most cases the more important.

In operating an automobile, the foot brake or running brake is the one that is commonly used to check the speed of the automobile, and the emergency brake usually is applied only while the automobile remains at rest. Even in case of an emergency the foot brake alone is commonly used to check the speed of the automobile, as often there is not time to apply the emergency or hand brake; and furthermore, both hands of the operator may be required at the steering wheel at this critical time.

It is therefore apparent that the foot brake should be maintained in efficient condition operable to check quickly the speed of the automobile, and it is important that the braking action upon each wheel be substantially equal, for if the brake adjustment is such that it acts more forcibly upon one wheel than the other it is likely to cause the rear portion of the automobile to skid sidewise, due to a greater retarding force being exerted by one wheel than the other.

The importance of maintaining the brakes of an automobile adjusted so that they will act with equal force on the opposite wheels is recognized in the automobile industry, and proper adjustment of the brake action upon the opposite wheels is sought by turning the wheels by hand under brake resistance. Such hand adjustment without means for comparing the action of the brakes, is guesswork and unreliable. The need of means for accurately determining the action of a brake upon the opposite rear wheels of an automobile is therefore apparent, and in my co-pending application, Serial No. 518,023, filed November 26, 1921, of which the present application is a division means is shown, described and claimed for testing the action of the brake upon each wheel.

In accordance with this earlier application the action of the brake upon the opposite wheels is tested by applying the brake to be tested, and then exerting a force independently upon the wheels to determine the force required to turn each wheel under the brake resistance. When the braking action of the emergency brake is to be tested the brake may be set as usual, but when the action of the foot brake is to be tested difficulty is experienced in maintaining the foot brake applied with the same force throughout the testing of the brake action on each wheel.

The primary object of the present invention, therefore, is to provide means for holding the foot brake applied with a desired force throughout the operation of testing the action of the foot brake upon the wheels.

A more specific object of the invention is to provide an attachment that may be secured to the steering post of an automobile to hold the foot brake treadle depressed.

Other objects of the invention and novel combination of parts in addition to the above will be hereinafter described in connection with the accompanying drawings which illustrate one good practical form thereof.

Figure 1:
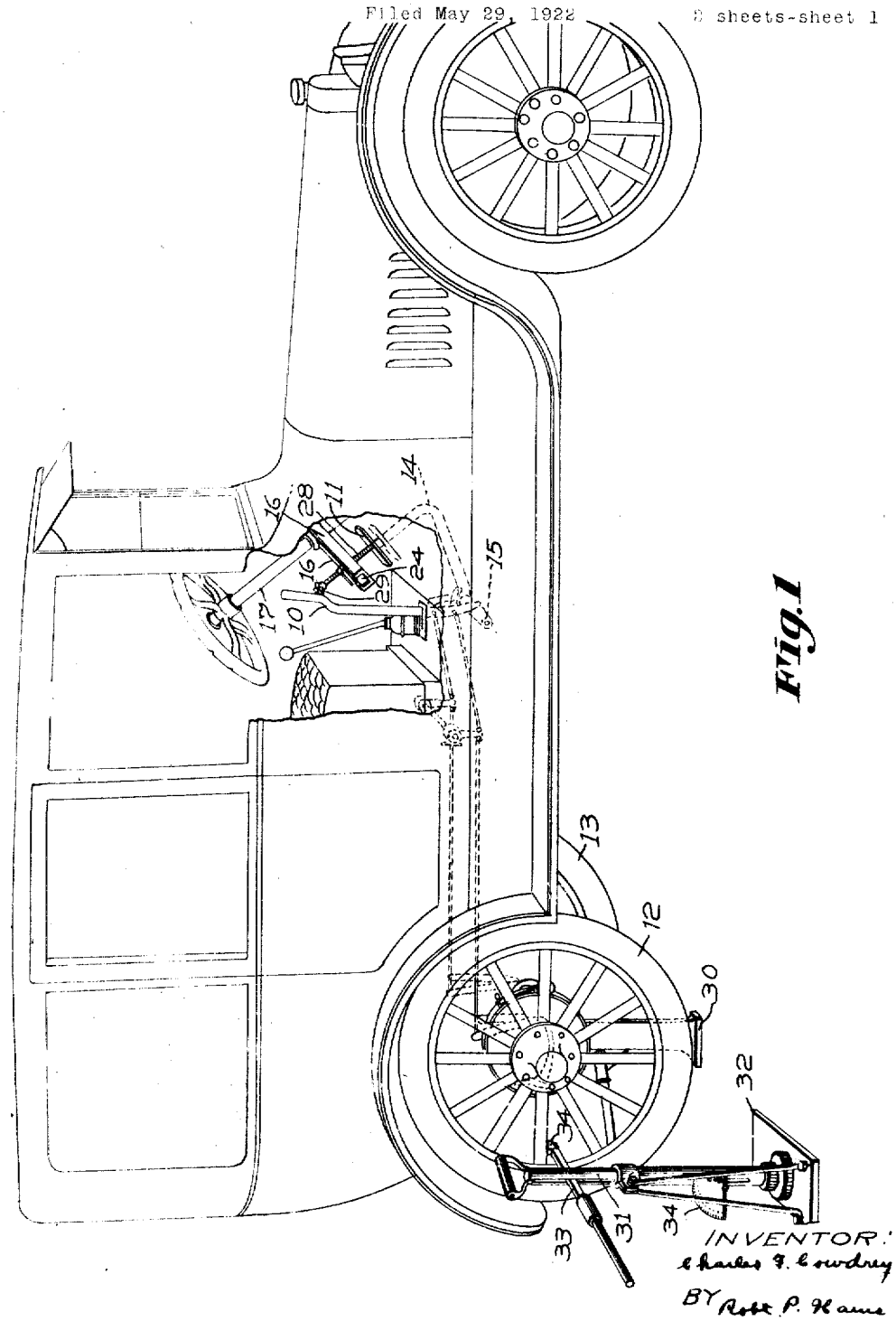
Fig. 1 is a perspective view of an automobile, and shows mechanism constructed in accordance with the present invention for holding the foot treadle depressed while the action of the foot brake is being tested.
Figure 2:
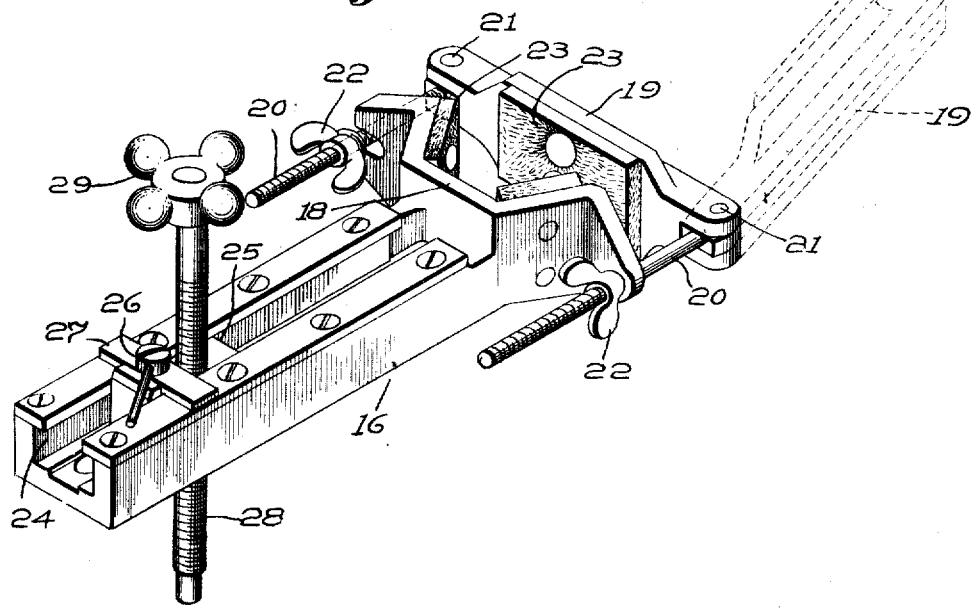
Fig. 2 is a perspective view of the attachment for holding the foot treadle depressed.
Figure 3:
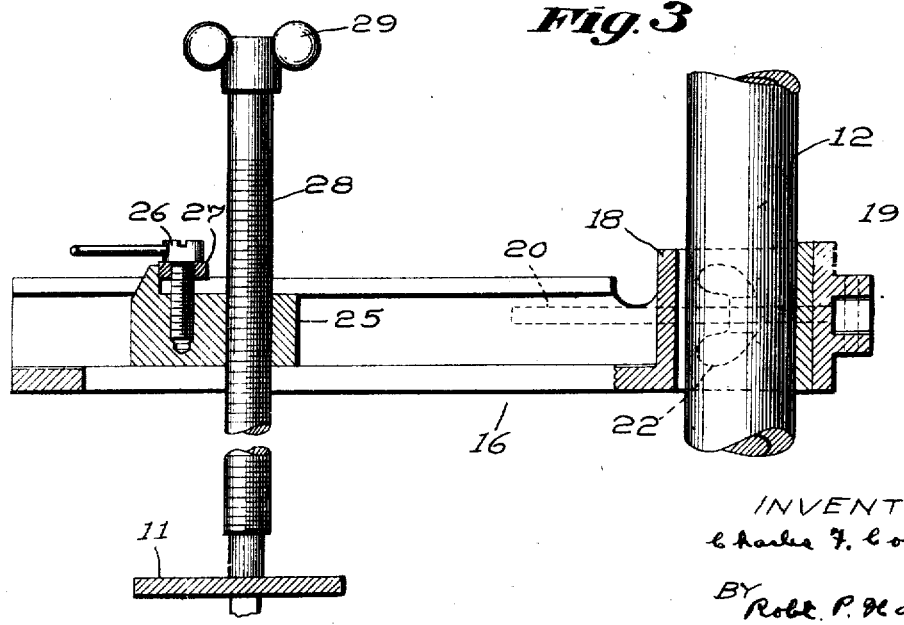
Fig. 3 is a longitudinal sectional view through the attachment of Fig. 2.

Referring to the drawings: The automobile of Fig. 1 forms no part of the present invention, and may be any automobile, the brakes of which it is desired to test. The automobile is shown as having an emergency or hand-operated brake lever 10 and a foot brake treadle 11. The emergency brake lever 10 is commonly operatively connected to brake means operable upon each rear wheel 12 and 13 of the automobile, and the foot brake treadle 11 is commonly operatively connected to other brake means operable upon each rear wheel. The foot brake treadle is commonly provided with a bent arm 14 pivoted at 15, and either the foot brake or the emergency brake may be applied independently of the other.

Preparatory to testing the action of the foot brake upon the rear wheels 12 and 13 the foot brake treadle 11 should be depressed sufficiently to apply the brake with the desired force, and should be secured in the depressed position so that the force with which the brake is applied will not vary during the testing operation. Various means may be provided to this end, and in the construction shown an attachment consisting of a bracket 16 is constructed to be secured to the steering post 17 of the automobile and clamped in position to hold the treadle 11 depressed. The bracket 16 has at one end thereof a fixed jaw 18 and an adjustable jaw 19 secured to the fixed jaw by bolts 20. The bolts 20 may be pivotally secured at 21 to the opposite ends of the jaw 19 and have wing-nuts 22 for forcing one jaw toward the other. The jaws preferably have their active faces covered with leather or other yielding material 23.

It is desirable that some means be provided between the bracket 16 and treadle 11 so that the pressure upon the treadle may be conveniently varied, and in order that the said means may be readily alined with the treadle, it should be adjustable toward and from the jaw end of the bracket. Therefore, in the present case, the bracket 16 is provided with a slideway 24 in which the block 25 is mounted for sliding movement lengthwise of the bracket, and the block may be secured in its adjusted position by locking means consisting of a screw 26 which may be rotated to force the strip 27 into clamping engagement with the upper face of the bracket. Through the block 25 extends a threaded bolt or stem 28 having a head 29 at its upper end that may be grasped by the hand to rotate the bolt.

The attachment described may be secured to the steering post 17 in the position shown in Fig. 1 by tightening up the wing-nuts 22. Whereupon the block 25 may be adjusted to bring the bolt 28 into alinement with the foot treadle 11, and the treadle may then be forced downwardly to the desired brake applying position by screwing downwardly the bolt 28. The braking effect of the foot brake upon each rear wheel may now be tested accurately by placing the testing device in the position shown in Fig. 1 to rotate the wheel so that the amount of force required to turn the wheel under the brake resistance will be shown by an indicator.

During the testing operation the wheel being tested should be supported clear of the ground by any suitable means such as a jack 30. The means for rotating the wheel may be variously constructed and in the construction shown consists of a column 31 supported in an upright position by a base 32, and a lever 33 is fulcrumed upon the column 31 and has a shoe 34 engageable with a spoke of a wheel to exert a lifting force upon the spoke as the lever handle is forced downwardly. The force required to turn the wheel is indicated by a recording or indicating device 34 that may be operated by the pressure exerted by the lever 33 upon its fulcrum. The wheel rotating means shown is more fully illustrated and described in the co-pending application above cited.

What is claimed is:

1. An attachment for holding the foot brake treadle of an automobile in brake applying position, comprising, in combination, a bracket, means for securing the bracket to a part of the automobile, a slide mounted upon the bracket and adjustable to different positions, a clamp for securing the slide in adjusted position, and means carried by the slide for holding the foot brake treadle in brake applying position.

2. An attachment for holding the foot brake treadle of an automobile in brake applying position, comprising, in combination, a bracket secured to the automobile to extend over the foot brake treadle, a slide adjustable on the bracket into position above the treadle, and means carried by the slide for holding the foot brake treadle in brake applying position.

3. An attachment for holding the foot brake treadle of an automobile in brake applying position, comprising, in combination, a bracket secured to the automobile to extend over the foot brake treadle, a slide adjustable on the bracket into position above the treadle, and a treadle holding stem adjustable lengthwise relative to the slide for holding the foot brake treadle in brake applying position.

4. An attachment for holding the foot brake treadle of an automobile in brake applying position, comprising, in combination, a bracket, means for supporting the bracket from a part of the automobile so that it will extend outwardly over the foot engaging position of the treadle, and means upon the bracket and adjustable downwardly therefrom to force the treadle to the brake applying position.

5. An attachment for automobiles comprising, in combination, a bracket, means for detachably securing the bracket to a portion of the automobile, a slide upon the bracket, and means upon the slide for holding a foot treadle depressed.

6. An attachment for automobiles comprising, in combination, a bracket, means for detachably securing the bracket to a portion of the automobile, and means upon the bracket for holding a foot treadle depressed, said means being adjustable relative to the bracket to suit variations in position of the foot treadle.

7. An attachment for automobiles comprising, in combination, a bracket, means for detachably securing the bracket to a portion of the automobile, a slide upon the bracket having means for holding a foot treadle depressed, and means for securing the slide in the desired position of adjustment.

8. An attachment for automobiles comprising, in combination, a bracket adapted to be supported in spaced relation to the brake foot treadle, and a threaded bolt supported by the bracket for adjustment into engagement with the treadle for holding the treadle depressed in any one of a number of different positions.

In testimony whereof, I have signed my name to this specification.

CHARLES F. COWDREY.